United States Patent

Wethington

[11] 3,816,215
[45] June 11, 1974

[54] SEALED EDGE MACHINE

[75] Inventor: Charles A. Wethington, Spartanburg, S.C.

[73] Assignee: Deering Milliken Research Corporation, Spartanburg, S.C.

[22] Filed: June 19, 1969

[21] Appl. No.: 834,843

[52] U.S. Cl.................. 156/366, 156/517, 156/522
[51] Int. Cl............................................ B32b 31/00
[58] Field of Search ........... 156/250, 251, 515, 366, 156/361, 271, 88, 321, 530, 518; 128/284, 287; 83/175; 161/1–9

[56] References Cited
UNITED STATES PATENTS

| | | | |
|---|---|---|---|
| 1,769,391 | 7/1930 | Reutener | 156/552 |
| 2,004,657 | 6/1935 | Gerard | 156/516 X |
| 2,444,685 | 7/1948 | Waters | 156/516 X |
| 2,612,950 | 10/1952 | Ewing | 83/175 |
| 2,749,817 | 6/1956 | Piazze et al. | 93/8 |
| 3,283,671 | 11/1966 | Campbell | 93/8 |
| 3,385,747 | 5/1968 | Klein et al. | 156/517 |
| 3,451,870 | 6/1969 | Pearson | 156/250 |
| 3,493,456 | 2/1970 | Vilutis | 156/515 |

FOREIGN PATENTS OR APPLICATIONS

1,302,623  7/1961  France................ 156/250

Primary Examiner—Samuel Feinberg
Attorney, Agent, or Firm—Norman C. Armitage; H. William Petry

[57] ABSTRACT

Method and machine to automatically provide severed sealed edge products to prevent unraveling. The machine is so designed to be capable of being adjusted to provide selected lengths of textile products.

7 Claims, 8 Drawing Figures

FIG. -1-

INVENTOR.
CHARLES A. WETHINGTON
BY
Earle R. Marden
ATTORNEY

INVENTOR.
CHARLES A. WETHINGTON
BY
Earle R. Marden
ATTORNEY

SEALED EDGE MACHINE

This invention relates generally to methods and apparatus for forming a thermoplastic type selvage in a textile material and more particularly to methods and apparatus for continuously forming from a roll of material such items as diapers, handkerchiefs, etc., which are automatically sealed with a thermoplastic film and cut from the roll to provide sealed selvages to prevent unraveling.

Prior to this invention it was known to heat seal a strip of thermoplastic material transverse to the longitudinal direction of a roll of fabric and cut such seal substantially in the center thereof to form individual sealed edge products. An example of such a machine is shown in U.S. Pat. No. 3,385,747 wherein a roll of fabric is sealed in the weft direction. This machine takes single width fabric with woven selvages in the warp direction and provides a product with only two sealed edges. Economically, it is desirable to take wide widths of fabric and seal longitudinal portions thereof and then sever the sealed portions substantially in the center thereof to provide a plurality of longitudinal extending sealed separated strips of fabric. These portions can then be automatically supplied to a machine which simultaneously transversely seals all the separated strips in the weft direction and then simultaneously severs the separated strips substantially in the center of the transverse seals to provide a plurality of individual textile products with edges sealed to prevent unraveling of the selvages.

Therefore, it is an object of the invention to provide a method and apparatus which automatically provides a plurality of sealed edge products from a single width of fabric.

Another object of the invention is to provide a method of and apparatus to apply a thermoplastic material in the longitudinal and transverse direction of a fabric to produce a product which has all the edges thereof sealed.

Other objects and advantages will become readily apparent as the specification proceeds to describe the invention in which.

In the preferred form of the invention sealed edge fabrics are being produced continuously from a roll of material. A roll of fabric of sufficient width to produce two of a desired product such as diapers, towels, etc., has a strip of thermoplastic film such as polyvinyl chloride, nylon-6, etc., heat sealed thereto in the longitudinal direction of the fabric. Then the fabric is slit in the middle of the seal to provide two lengths of fabric and preferably supplied continuously to a machine which heat seals another strip of thermoplastic film across the whole width of each the lengths of fabric. As with the above-mentioned longitudinal seal, the film material can be polyvinyl chloride, nylon-6 or any other suitable material. Each of the lengths of fabric are then cut approximately in the center of the seal across the width thereof to provide a sealed edge product. Normally the longitudinal direction of the fabric is the warp direction and the width of the roll of fabric is the fill or weft direction.

Figure 2:
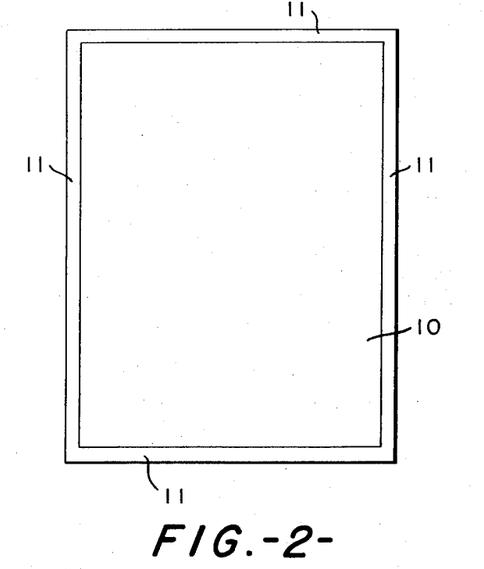
FIGS. 2 and 3 show products produced by the apparatus shown in FIGS. 1 and 4.
Figure 3:
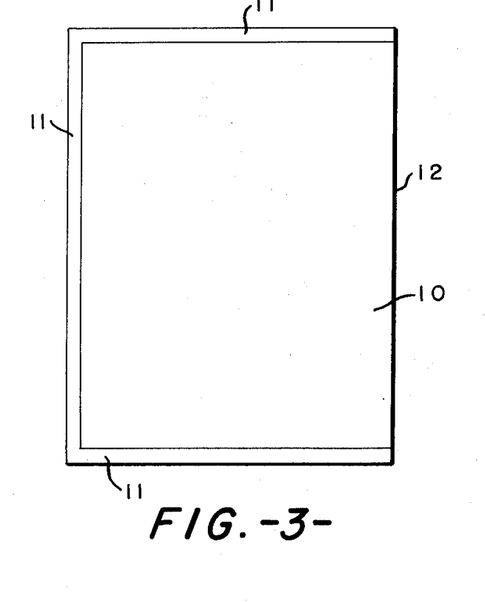

FIGS. 2 and 3 represent products obtained from the hereindisclosed invention. FIG. 2 shows a product 10 which has all four edges sealed with a thermoplastic seal 11. The product of FIG. 3 is obtained when the roll of fabric slit longitudinally has a selvage 12 finished on the loom so it is only necessary to provide thermoplastic seals 11 on three edges thereof.

Figure 1:
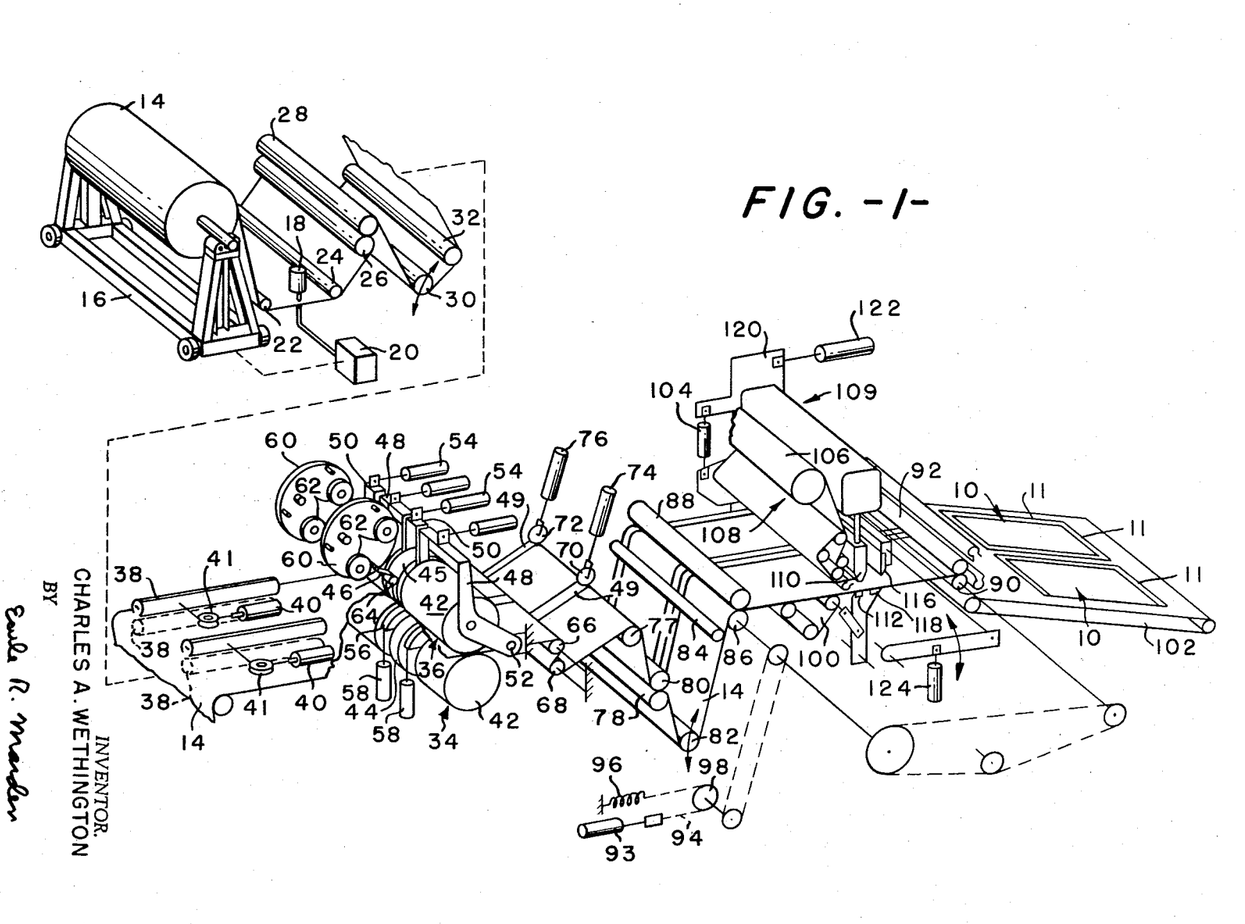
FIG. 1 is a schematic representation of the preferred method and apparatus to produce a sealed edge product.

Looking now to FIG. 1, the machine schematically represented shows an arrangement wherein one of each of the products of FIGS. 2 and 3 are obtained on each cycle of the machine. It is obvious that two products like FIGS. 2 or 3 can be obtained depending on whether none, one or two of the selvages of the roll of fabric 14 are finished or hemmed prior to introduction into the machine.

In FIG. 1 the overall machine to produce the products of FIGS. 2 and 3 is schematically shown. The roll of fabric 14 to be sealed is supported on a dolly 16, the transverse position of which is controlled by a conventional edge guide device. Briefly, the edge guide device consists of a sensing element 18 which senses the edge of the fabric 14 and if the edge of the fabric 14 is not properly positioned a signal will be relayed to the control member 20 to move the dolly in one direction or the other. In the preferred form of the invention, the system employed is hydraulic and the dolly 16 is moved back and forth by a hydraulic piston. Such a system is conventional and per se is not part of the invention.

In the preferred form of the invention, the fabric 14 passes under idler rolls 22 and 24 into the nip of feed rolls 26 and 28 from whence it is supplied under dancer roll 30 and idler 32 into the nip of sealing rolls, generally designated 34 and 36. Preferably, the rolls 34 and 36 are driven at a speed slightly faster than the nip rolls 26 and 28 in order to maintain a pre-determined tension in the fabric between the two pairs of rolls. Dancer roll 30 automatically controls the speed of roll 26 depending on the vertical position of the dancer roll in a manner such as that disclosed in U.S. Pat. No. 3,385,747.

As discussed briefly before, it is preferred to provide seals on the fabric made from suitable thermoplastic polymer film such as polyvinyl chloride, nylon-6, etc. In the use of such films certain variables have to be taken into consideration such as the pressure exerted on the film-fabric sandwich in the nip, the temperature of the hot surfaces of the nip, the temperature of the fabric entering the nip, the temperature of the film entering the nip, thickness and construction of the fabric, thickness and constituency of the film the speed at which the fabric passes through, the tension of the fabric and the tension of the film entering the nip. Also it is felt that the temperature of the film in the hot nip must be at least at the softening point to allow the polymer to flow into the fabric. As an example the softening temperature of a 3.5 mil thick polyvinyl chloride plasticized polymer film is about 350°F. To provide the best means to maintain such temperature it is felt that the temperature and speed of the fabric and film coming together at the nip of rolls 34 and 36 should be controlled. If these variables are not controlled, various defects in the seal will occur depending on the type of variance. For example, if the film is not sufficiently warm, the flow into the fabric may be insufficient and poor seal adherence may result. If the fabric temperature is not sufficiently high, or if the hot surfaces of the pressure nip are not at a sufficiently high temperature, the fabric and film will be quenched at some temperature below the softening point and again poor seal adherence will result. Conversely, if the fabric temperature exceeds the desired temperature to an extent that the fabric becomes dehydrated, discoloration of the fabric can result. In the use of polyvinyl chloride, the film temperature prior to entering the nip must be such that it does not approach the softening temperature to prevent loss of dimensional stability and consequently the production of irregular seals. Further, the pressure at the nip has to be sufficient to cause the softened film to adequately penetrate the fabric.

It can be readily seen from the above that certain conditions must be met once the fabric and film have been selected. As previously discussed, the fabric 14 is delivered from the nip rolls 26 and 28 to the nip of roll members 34 and 36 at a pre-determined tension and speed. Depending on the speed selected the fabric can be pre-heated in the area of the longitudinal seal by pre-heaters 38 above and below the fabric. Pre-heaters 38, preferably, are infrared lamps which provide radiant energy for pre-heating of the fabric. Schematically shown are pneumatically actuated pistons 40 which are actuated by a fabric temperature sensing device, not shown, to actuate members 42 to open and close shutters on the pre-heaters 38 in response to the temperature sensed to control the heat supplied to the fabric. At slow fabric delivery speeds such as 12–14 yards/minute, pre-heaters 38 normally would not be actuated since the fabric has sufficient time to be heated by the hot portion of the roll members 34 and 36.

Roll members 34 and 36 consist of rubber covered carrier rolls 42 and cast iron heated rolls 44 and 45 to heat seal the film 46 into the fabric 14. Preferably, the cast iron rolls are heated by electrical cartridge heaters (not shown). Cast iron rolls 44 and 45 are preferably treated with a release agent such as silicone to provide the hot roll surfaces with improved release properties. The number of cast iron rolls employed is dependent upon the number of longitudinal seals laid upon the fabric. In the preferred embodiment, since it is desired to lay down two seals 49 two pairs of cast iron rolls 44 and 45 are employed. To provide controlled nip pressure to the rolls 42, 45 yoke members 48 and 50 are pivotally secured at 52 and held in nip forming relationship with the lower rolls by the application of pressure from the pneumatically actuated cylinders 54. Semicircular fabric lifter members 56 actuated by pneumatically actuated cylinder 58 are provided to lift the fabric 14 off the lower hot rolls 44 when the upper rolls 42 and 45 have been automatically pivoted away from the lower rolls when the machine is stopped.

The film 46 to be sealed to the fabric is provided in roll form on film carriers 60 mounted on the machine. Preferably the carriers 60 contain more than one film roll 62 so that the application of film to the fabric can be continuous so that one roll of film can be automatically threaded up as another roll is running out. The film 46 is supplied over an adjustably mounted roll 64 onto the hot surface of the upper hot roll 45 prior to entrance into the nip of the rolls 44. The amount of wrap of the film 46 around the upper roll 45 is dependent on the amount of pre-heat necessary for the film to be heated to a molten state without it losing its form or continuity and is a function of roll speed, not roll temperature and film properties. This amount of wrap is controlled by the position of the driven roll 64 relative to the peripheral surface of the upper hot roll 44.

As pointed out before, the lower roll member 34 is driven so that the fabric 14 is drawn into the nip of rolls 42, 44 and 45 as the molten film 46 is applied thereto and penetrates the fabric 14 due to the pressure between the upper and lower hot rolls 44. In the preferred form of the invention the fabric from the longitudinal sealing machine is supplied to another mechanism which also places a transverse seal upon the fabric but it is within the scope of the invention to take up the fabric on a suitable take up roll after it has been sealed longitudinally and cut. It has been found that when the fabric is supplied to a transverse sealing mechanism there is sufficient time for the longitudinal seal to set so additional cooling is not necessary since the production rate of the transverse sealing mechanism is comparatively slow. If it is desired to take up the fabric immediately after longitudinal sealing and cutting, cooling cans or rolls should be used in order to set the seal before take-up.

As shown in FIG. 1, the fabric 14 with the longitudinal seals 49 thereon passes over a pair of fixed bars 66 and 68 to a pair of score cutters 70 and 72, the cutting pressure of which is controlled by pneumatic pistons 74 and 76. As is well known in the art, score cutting, a cutting edge bearing on a hardened surface, 78, has a squeezing type separation, which when applied to a still plastic seal forces the seal around the severed yarns. The fixed bars 66 and 68 tend to squeeze and smooth out the surface of the longitudinal seal 48 so that the cutters 70 and 72 do not pick up portions of the still tacky seal. Thusly, it is an advantage to slit the longitudinal seals 49 by score cutting immediately downstream of the seal application zone because of easy registry of the cutter to the seal and quality of the sealed edge.

The tension is maintained on the fabric 14 after passage through the nip of roll members 34 and 36 by a pair of nip rolls 78 and 80 driven at a speed slightly higher than the speed of the roll members 34 and 36. Nip rolls 78 and 80 and roll members 34 and 36 preferably are driven continuously by the same motor as rolls 34, 36, 78 and 80 and the dancer roll 30 can then be eliminated since the dancer roll 82 which controls the speed of the above-mentioned in a manner similar to that disclosed in U.S. Pat. No. 3,385,747 will then also control the speed of rolls 26 and 28. Dancer roll 82 within a narrow range also acts as an accumulator since the transverse sealing mechanism operates intermittently while the longitudinal sealing portion of the machine operates continuously. The dancer roll 82, when the transverse sealing mechanism is not taking fabric, moves downwardly as the longitudinal sealing portion of the machine continues to supply longitudinally sealed fabric.

From the dancer roll 82 the longitudinally sealed fabric 14 is supplied under an idler roll 84 to the nip of the intermittently driven input rolls 86 and 88 of the transverse sealing mechanism of the machine. The input nip rolls 86 and 88 and the output nip rolls 90 and 92 are driven by pneumatically actuated piston 93 which, when actuated, pulls the chain 94 to the left against the bias of spring 96 to rotate sprocket 98 which in turn through suitable mechanical linkage rotates the bottom rolls 86 and 90 a pre-determined distance in one direction only. The pre-determined distance of rotation of the rolls 86 and 90 determines the length of fabric between transverse seals and can be adjusted to obtain various length products by adjusting the stroke of the piston 93. Located under the fabric 14 between the input and output rolls is a continuously rotating apron system 100 for reasons hereinafter explained. To prevent the fabric 14 from engaging the upper surface of the apron system 100 when the fabric 14 is held between the nips of the input and output rolls the nip of the output rolls 90 and 92 are located slightly higher than the nip of the input rolls 86 and 88. To provide tension in the fabric between the input and output rolls the output rolls 90 and 92 are driven at a speed greater than the input rolls 86 and 88. This differential speed between the rolls also tends to keep wrinkles out of the fabric and expedites the passage of a cut product onto the endless conveyor 102.

Assuming for the sake of discussion, the transverse sealing mechanism has been indexed to feed completed sealed products 10 onto the conveyor 102 and fabric 14 is held between the nip rolls 86 and 88 and 90 and 92. The fabric 14 is not in the position to have a transverse seal placed thereon. When the fabric 14 has been moved to the position shown or just before the fabric reaches this position the piston 104 is actuated to advance a strip of film material from the roll of film 106 on the film feeding mechanism generally designated 108. The film feed and upper platen assembly 109 are identical to and operate in the same manner as that shown in U.S. Pat. No. 3,385,747 to place the strip of advanced film onto the fabric and heat seal same thereto. In other words, the upper platen 110 is actuated to a downward position onto the film material and fabric and cooperates with the lower platen 112 to heat seal the film to the fabric. Then the piston 104 is actuated in the opposite direction to pivot the film feed mechanism back to its original position and the upper platen is lifted up off the newly formed sealed fabric portion. It should be noted at this point that upper platen 110 is fixed relative to lower platen 112 and that upper blade 116 is fixed relative to the lower blade 118 so that when the platen support member 120 is pivoted the platens and blades move together. When the upper platen 110 is retracted the piston 122 is actuated to pivot the platen support member 120 to move the platens and blades counterclockwise to a position where the knife blades 116 and 118 are over and under the previously formed transverse seal. Then the piston 124 is actuated to bring the upper knife 116 blade downwardly to cooperate with the lower knife blade 118 to sever the fabric 14 substantially in the center of the seal. Then the upper blade 118 is retracted and the platen support member 120 pivoted back by the piston 122 to the position shown in FIG. 1. When the platen support member 120 has returned or almost returned to the position shown in FIG. 1, the piston 93 is actuated to rotate the rolls 86 and 88 and rolls 90 and 92. Actuation of output rolls 90 and 92 causes the completed sealed edge products 10 to be delivered to the endless conveyor which deposits them in a suitable container or stacking device. As discussed before, apron system 100 is driven continuously but does not contact the fabric 14 in the position shown in FIG. 1 but the fabric 14, when severed by the blades will, tend to drop onto the aprons. Then when the rolls 86 and 88 are actuated the aprons will guide the fabric 14 into the nip of rolls 90 and 92 for the next operation. Then the herein described operation is successively repeated to provide a plurality of sealed edge products.

Figures 4, 6:
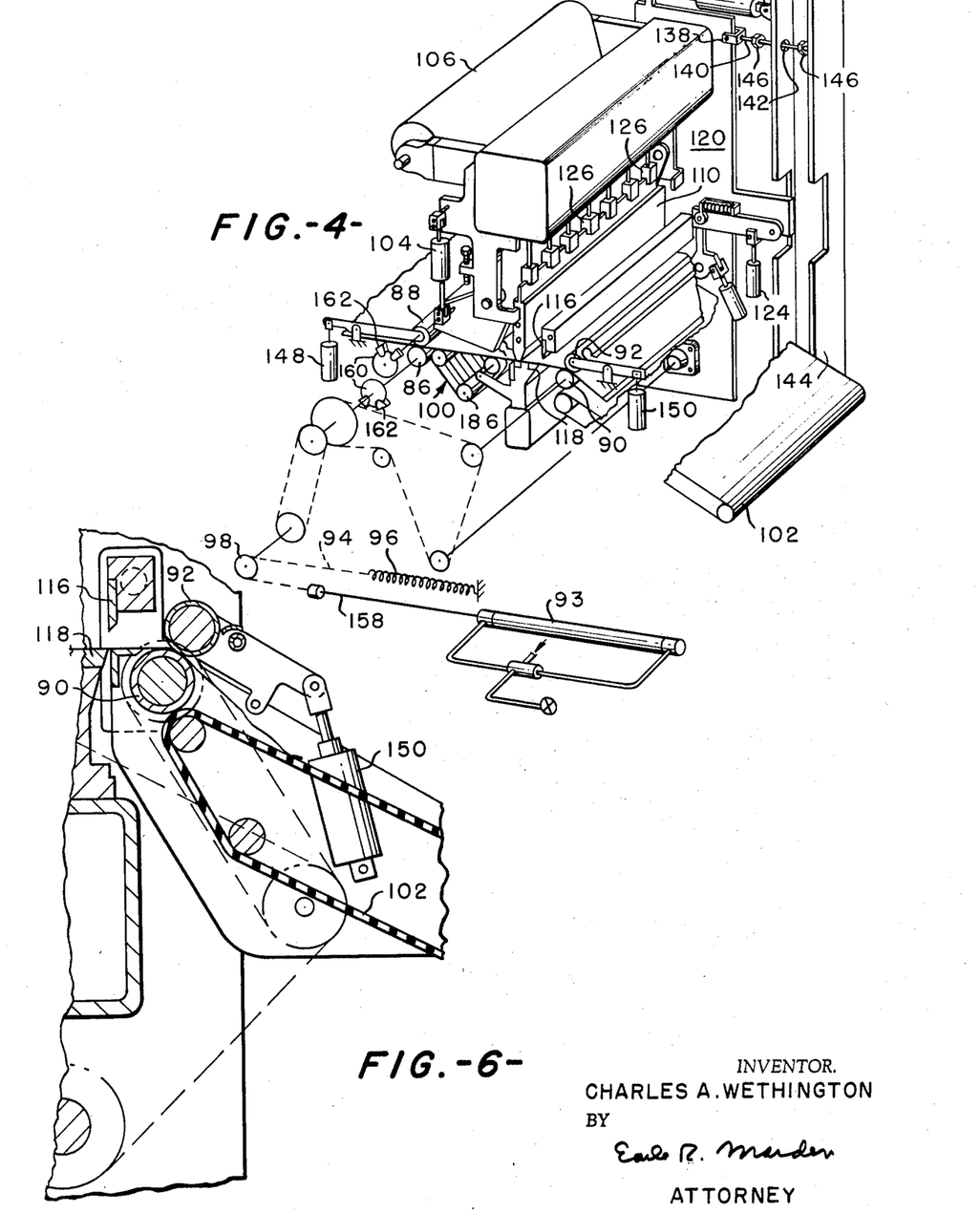
FIG. 4 is a perspective blown-up view of the transverse sealing portion of the machine.
FIG. 6 is an enlarged end view of the output nip rolls and conveyor shown in FIG. 4.
Figure 5:
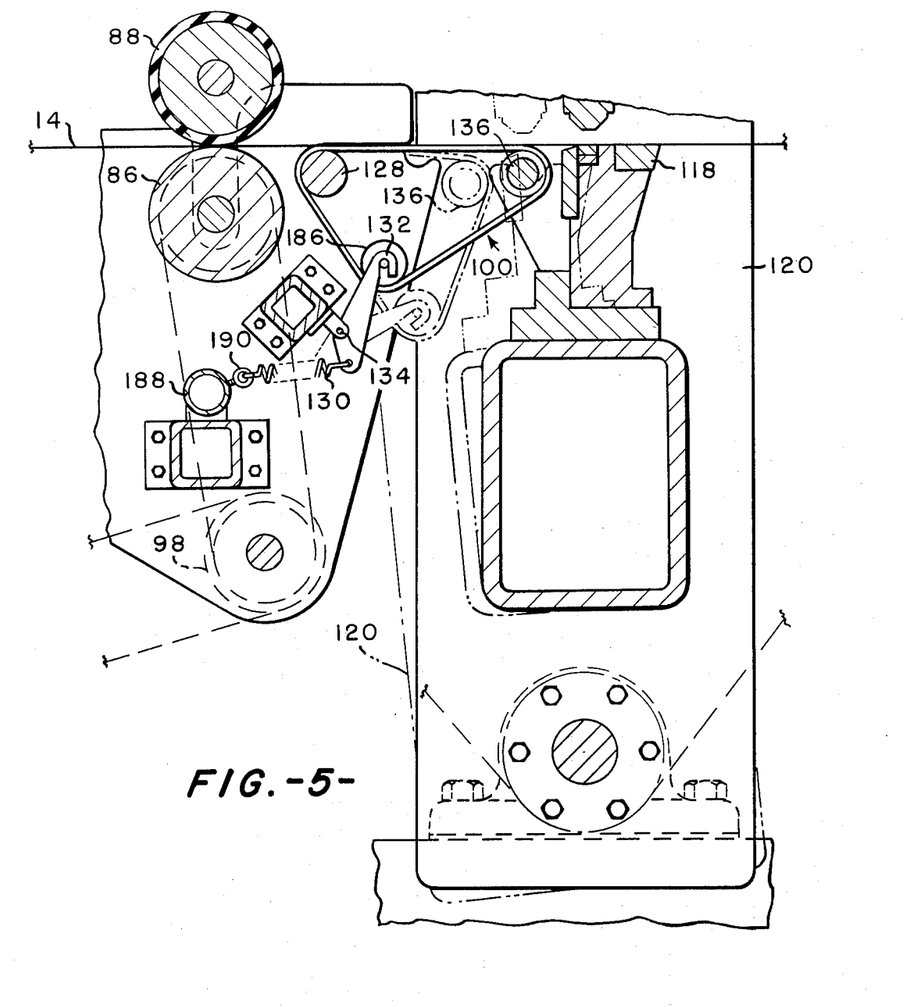
FIG. 5 is an enlarged end view of the apron system shown in FIG. 4.

Looking now to the drawings in more detail, FIGS. 4 and 5 show more specifically the traverse sealing mechanism. In FIG. 4 the piston 93 has been reversed for the sake of illustration and the upper platen 110 is shown in the heat sealing position. When the upper platen 110 has been raised by the pistons 126 the platen support member 120 will be pivoted to the dotted line position shown in FIG. 5 to move the lower cutting blade under the newly made seal and the upper blade over the newly made seal for the purpose of severing the fabric 14 substantially in the center of the seal to provide substantially equal seals on both of the severed edges.

As discussed briefly before, the fabric 14 is held between the input nip rolls 86 and 88 and the output nip rolls 90 and 92 so that the cutting blades 116 and 118 are mounted in a fixed position relative to each other thereby eliminating the necessity of synchronizing the blades on each cut. In other words the blades move relative to the fabric rather than the fabric moving relative to the blades. Since this movement is desired the bottom apron roll 186 is spring loaded by spring 130 (FIG. 5) so that the lever arm 132 pivotally mounted at 134 exerts a downward bias on the roll 186 so that when apron roll 136 is moved rearwardly by the platen support 120 the apron roll 186 will cause the apron system 100 to assume the dotted line position shown in FIG. 5 to maintain tension on the aprons. It should be noted that a stop member, consisting of a U-shaped bracket 138 connected to platen support member 120, a bolt 140 projecting through an opening 142 in the machine frame 144 and a pair of nuts 146 threaded onto the bolt 140 on opposite sides of the opening, is employed to limit the pivotal movement of the platen support member 120 relative to the frame 144. Obviously, nuts 146 can be adjusted to vary the pivotal movement of the platen support member 120 relative to the frame 144.

The nip pressure between the input nip rolls 86 and 88 is controlled by an air cylinder 148 at each end of nip roll 88 and the nip pressure between the output rolls 90 and 92 is controlled by an air cylinder 150 at each end of nip roll 92. Preferably, the input nip roll pressure is considerably greater than the output nip roll pressure to ensure a positive feed of the fabric when indexed. The output nip roll pressure under normal conditions is only high enough to take the wrinkles of the fabric without excessively increasing the tension therein.

Figure 7:
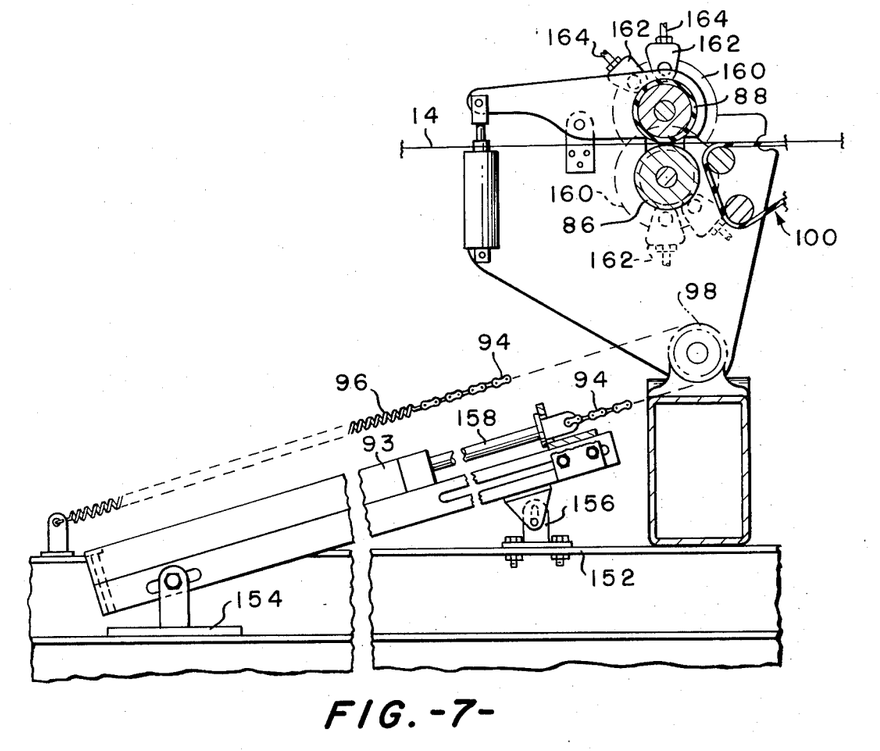
FIG. 7 is an enlarged end view of the input nip rolls and indexing mechanism.

FIG. 7 shows in more detail the input rolls and idexing mechanisms of the transverse sealing mechanism. The indexing piston 93 is mounted on a suitable frame 152 by brackets 154 and 156. As previously described, air is supplied to the right end (FIG. 7) of the cylinder 93 to move piston rod 158 to the left against the bias of spring 96. Through suitable drive means the lower input roll 86 is driven to feed fabric to the transverse sealing mechanism. Fixed to each of the input rolls 86 and 88 is a brake disc 160 which is engaged by clamping members (not shown) inside of the triangular shaped housing members 162 when air is supplied to conduits 164 just prior to the bottoming of the piston in the cylinder 93 to prevent overfeed of fabric 14 due to inertia of the rolls 86 and 88. In other words, input rolls 86 and 88 are positively braked to stop the fabric at a predetermined position.

Figure 8:
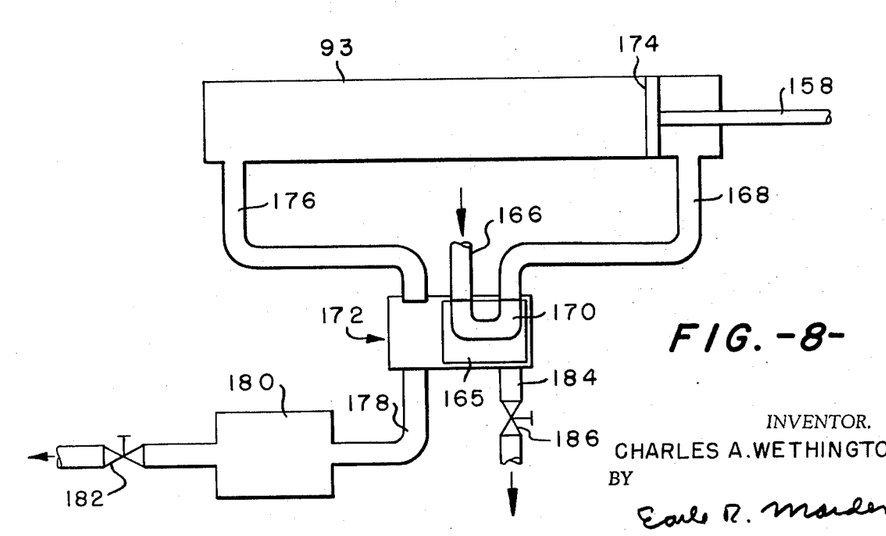
FIG. 8 is a schematic view of the indexing cushioning arrangement.

The inertia of the rolls 86 and 88 is considerable so it is desired to slow the speed of the rolls near the end of the indexing cycle in conjunction with the use of the above described braking system. Preferably, this is accomplished by dampening the stroke of the piston rod 158 at the end of the indexing stroke as shown in FIG. 8. FIG. 8 shows the cylinder 93 just after the reversing valve 165 has been moved to supply air from air source or conduit 166 to conduit 168 through the conduit 170 in the valve assembly 172. As the piston head 174 moves rapidly to the left, air is exhausted through conduit 176, valve 165, conduit 178 into the receiver 180 and bled to atmosphere through bleed 182. As the pressure in the left end of the cylinder builds up due to the back pressure created by the bleed 182, the piston head 174 will slow down as it nears the end of the stroke since the back pressure will oppose the incoming air pressure on the right hand side of the piston head 174. Slowing down of the piston head 174 and rod 158 will in turn slow down the speed of the chain 94 and consequently the rotation of input nip roll 86. As discussed above, the brake clamping means will be actuated to clamp the brake disc 160 just prior to the arrival of the piston head 174 at the end of its stroke.

As soon as the indexing of a preselected length of fabric 14 has been completed the valve 165 will be automatically reversed and air will be supplied to the left end of the piston head through conduits 166, 170 and 176 and air will be slowly bled from the right hand side of the piston head through conduit 168, valve 165, conduit 184 and bleed 186 to return the piston head 174 to the position shown in FIG. 8. Input nip roll 86 will not be rotated since an over running clutch is employed between the nip roll 86 and the drive from the piston 93.

It can be seen that the length of fabric indexed can be varied within certain dimensions by changing the stroke of piston heat 174 or by changing ratio of diameter of sprockets and input nip roll. This can be accomplished very readily and provides a machine which can be employed to seal and cut textile products of varying lengths providing great flexibility with one machine.

The herein disclosed apparatus and method efficiently and automatically provides a roll of material with a longitudinal seal and transverse seal and delivers a textile product which has all the edges sealed to prevent unraveling. The disclosed apparatus has the further advantage that it can readily be adapted to provide different lengths of sealed edge textile products.

Although the preferred embodiments of the invention have been described in detail, it is contemplated that many changes may be made without departing from the scope or spirit of the invention and it is desired to be limited only by the claims.

That which is claimed is:

1. Apparatus to form a selvage in a running sheet of fabric comprising: means for supplying a web of material, means to periodically index pre-determined lengths of said material, film feeding means mounted on said apparatus to apply a strip of thermoplastic film periodically across the width of said fabric, means to heat seal said film to said fabric, means to sever said fabric through said seal to provide a fabric with a sealed selvage, said indexing means including a pair of driven input rolls and a pair of driven output rolls, said indexing means also including a piston means having a pre-determined stroke to drive said input rolls a periodic distance to advance the pre-determined length of fabric and a control means to slow the movement of said piston means at the end of the stroke to slow the rotation of said input rolls, said control means including a bleed on the exhaust conduit of said piston means to build up a back pressure opposing the movement of said piston means.

2. Apparatus to form a selvage in a running sheet of fabric comprising: means for supplying a web of material, means to periodically index pre-determined lengths of said material, film feeding means mounted on said apparatus to apply a strip of thermoplastic film periodically across the width of said fabric, means to heat seal said film to said fabric, means to sever said fabric through said seal to provide a fabric with a sealed selvage, said apparatus including a frame and a support member movable with respect to said frame, said means to feed film, heat seal and sever being mounted on said support member, said severing means including a means to pivot said support member relative to said frame to position said severing means over the strip of thermoplastic film sealed to said fabric.

3. The apparatus of claim 2 wherein said indexing means includes a first pair of driven nip rolls on one side of said film feeding means and a second pair of driven nip rolls on the other side of said film feeding means.

4. The apparatus of claim 3 wherein said indexing means also includes a means to drive the second pair of rolls slightly faster than the first pair of rolls to place the fabric under tension.

5. The apparatus of claim 3 wherein said indexing means includes a piston means having a pre-determined stroke to drive said first pair of rolls a periodic distance to advance the pre-determined length of fabric.

6. The apparatus of claim 5 wherein said indexing means includes a control means to slow the movement of said piston means at the end of the stroke to slow the rotation of said first pair of rolls.

7. The apparatus of claim 6 wherein said control means includes a bleed on the exhaust conduit of said piston means to build up a back pressure to oppose the movement of said piston means.

* * * * *

UNITED STATES PATENT OFFICE
CERTIFICATE OF CORRECTION

Patent No. 3,816,215          Dated June 11, 1974

Inventor(s) Charles A. Wethington

It is certified that error appears in the above-identified patent and that said Letters Patent are hereby corrected as shown below:

Column 5, line 30, the word "not" should read --now--.

Signed and sealed this 1st day of October 1974.

(SEAL)
Attest:

McCOY M. GIBSON JR.
Attesting Officer

C. MARSHALL DANN
Commissioner of Patents